(12) United States Patent
Burlacot

(10) Patent No.: US 7,093,637 B2
(45) Date of Patent: Aug. 22, 2006

(54) RADIAL TIRE SIDEWALL REINFORCEMENT

(75) Inventor: Laurence Burlacot, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 162 days.

(21) Appl. No.: 10/720,184

(22) Filed: Nov. 25, 2003

(65) Prior Publication Data

US 2004/0103968 A1 Jun. 3, 2004

Related U.S. Application Data

(63) Continuation of application No. PCT/EP02/05742, filed on May 24, 2002.

(30) Foreign Application Priority Data

May 31, 2001 (FR) .................................. 01 07203

(51) Int. Cl.
*B60C 15/00* (2006.01)
*B60C 15/06* (2006.01)
*B60C 9/00* (2006.01)

(52) U.S. Cl. .................. 152/555; 152/539; 152/543

(58) Field of Classification Search ................ None
See application file for complete search history.

(56) References Cited

U.S. PATENT DOCUMENTS

| 3,464,477 | A |   | 9/1969 | Verdier |         |
|-----------|---|---|--------|---------|---------|
| 4,215,737 | A | * | 8/1980 | Motomura et al. | 152/541 |
| 4,436,130 | A |   | 3/1984 | Suzuki et al. |  |
| 4,438,796 | A |   | 3/1984 | Abe et al. |  |
| 4,747,436 | A |   | 5/1988 | Williams |  |
| 4,934,431 | A | * | 6/1990 | Agari et al. | 152/543 |
| 4,953,605 | A | * | 9/1990 | Kawamura et al. | 152/541 |
| 5,078,192 | A |   | 1/1992 | Lindsey |  |
| 5,379,819 | A | * | 1/1995 | Adachi | 152/542 |

* cited by examiner

*Primary Examiner*—Justin Fischer
(74) *Attorney, Agent, or Firm*—Buchanan Ingersoll & Rooney PC

(57) ABSTRACT

Radial tire including a crown, two beads extended by sidewalls including a radial carcass reinforcement, the carcass reinforcement extending into the crown and anchored in each bead to at least one element that is inextensible in the circumferential direction, the tire including in at least one sidewall a supplementary reinforcement formed of rubber with reinforcing elements inclined relative to the circumferential direction and wherein, when viewed in meridian cross-section:
  the supplementary reinforcement includes at least one group of at least two strips that extend in the circumferential direction;
  each strip, of width Li essentially equal to or greater than the total width Lt of the reinforcement divided by the total number of strips in the group concerned, is formed of rubber reinforced by a plurality of cables or wires inclined at an angle α between 30° and 90°;
  within any one group, each circumferential strip is superimposed partially with an adjacent strip.

20 Claims, 2 Drawing Sheets

RADIAL TIRE SIDEWALL REINFORCEMENT

This application is a continuation of international PCT application Ser. No. PCT/EP02/05742, filed May 24, 2002, which was published in English as WO 02/096674 A1 on Dec. 5, 2002, and which is incorporated by reference.

FIELD OF INVENTION

The invention concerns the reinforcement of tires and more particularly the reinforcement of tires with radial carcass reinforcement, that is, carcass reinforcement whose reinforcing elements lie in radial planes containing the rotation axis, or even form small angles with the said radial planes. It applies to all types of tires but more especially to tires designed for off-road rolling on rocky ground, stones, or more generally rough and aggressive ground.

BACKGROUND OF INVENTION

As is known from the prior art, a radial tire has areas called beads designed to cooperate with the seats and flanges of a mounting rim, the said beads comprising a reinforcement structure in the circumferential direction, to which the carcass reinforcement is anchored. Radially on the outside of the carcass reinforcement is arranged a crown reinforcement comprising at least two plies whose role, among others, is to hoop around the said carcass reinforcement when the tire is being pressurized for use above the said beads. Radially outside the crown reinforcement is positioned a tread with a plurality of reliefs that form the pattern of the tire. Between each bead and each axial end of the crown extends a sidewall of the tire whose function is to provide a mechanical link between the said bead and the said crown while undergoing more or less pronounced bending during rolling.

This bending leads to substantial deformations associated with the marked variations of the sidewall curvature and when a tire is used on rough ground with numerous bumps or obstacles, the combination of forces can give rise to breaking of the sidewall rubber or even damage to the carcass reinforcement. To overcome this problem it has been proposed to add to the tire sidewalls at least one ply of rubber reinforced with cables, the said cables making a non-zero angle with the radial or meridian direction. Document U.S. Pat. No. 3,464,477 proposes to add within each sidewall and on the inside of the carcass reinforcement a reinforcement extending on either side of the half-way height of the sidewall and over a fraction of the radial height of the said sidewall. This solution, however, which is very effective, has a disadvantage related to the fact that having regard to the radial heights of sidewalls, it is often difficult to obtain in the tire the desired angle of the reinforcements, let alone that the said reinforcements are subjected to stresses that have an adverse effect on their mechanical resistance even on account of the variable curvatures they undergo in the tire due to the sidewall deformations.

Document U.S. Pat. No. 5,078,192 describes a tire structure comprising in its sidewalls at least one supplementary reinforcement armature designed to protect the said sidewalls against aggressions during rolling, this reinforcement being formed by the winding in the circumferential direction of strips that comprise reinforcing elements orientated circumferentially; in the said document the strips are arranged edge to edge in a meridian direction. This solution raises many manufacturing problems since it requires the reinforcements orientated circumferentially to be positioned on a tire blank that has already been shaped.

Consequently, there is need for a solution that enables the reinforcement of tires intended to roll over difficult ground, but one which does not have the disadvantages of the technical solutions of the prior art mentioned above, and in particular one which makes it possible to shape the tire in the form of a toric blank produced on a building drum.

U.S. Pat. No. 4,438,796 describes a tire structure for carrying heavy loads (in particular, for use on civil engineering vehicles), in which at least one of the sidewalls has a supplementary reinforcement consisting of one or more layers comprising inclined reinforcements; in one variant, it is specified that each layer comprises a plurality of circumferential strips separate from one another within the same layer.

SUMMARY OF THE INVENTION

The tire according to the present invention, which is intended for off-road use on aggressive ground, comprises a crown reinforced by a reinforcement armature comprising at least two plies of rubber reinforced with cables or wires crossed from one ply to the next and surmounted radially by a tread designed to be in contact with the ground, two beads designed to be in contact with the seats of a fitting rim, each bead being extended by a sidewall comprising a radial carcass reinforcement formed of at least one ply of rubber reinforced by a plurality of cables or wires, the said carcass reinforcement being anchored in each bead and extending into the crown, the said tire comprising in at least one sidewall a supplementary reinforcement formed of rubber and reinforcing elements inclined relative to the circumferential direction. This tire is characterized in that:

the supplementary sidewall reinforcement comprises at least two groups each formed of at least two strips extending in the circumferential direction;

each strip, of width Li essentially equal to or greater than the total meridian width Lt of the supplementary reinforcement divided by the total number of strips in the group considered, is formed of rubber reinforced by a plurality of cables or wires inclined at an angle α between 30° and 90°, this angle being measured on a new tire relative to the circumferential direction;

within a given group, each circumferential strip is superimposed partially over an adjacent strip, to avoid lack of contact between the strips with a space between any two successive strips.

By a strip 'adjacent' to another strip within a group is meant a strip that prolongs the said other strip with an overlap between the said strips.

Each strip Bi of a given group is coupled by partial overlap to the strip(s) adjacent to it in the said group to form a screen with no gaps against any propagation of a possible break of the rubber mixtures of the tire from the tire's outside inwards.

Preferably, the width of the overlap areas of a strip in one group with each adjacent strip in the same group is at most equal to 40% of the said strip's width, such that optimum coupling is obtained while limiting excess thicknesses in the sidewall.

The total width Lt of the supplementary reinforcement is measured on a new tire along a meridian profile thereof, obtained in a section plane containing the rotation axis of the tire between the point radially furthest on the inside and the point radially furthest on the outside of the said reinforcement.

To increase still further the efficacy with which the supplementary reinforcement protects the sidewalls of the tire, it is best to provide for the presence between each group of a rubber mixture section that spaces the said groups; preferably, the modulus at 10% elongation of the rubber mixture constituting this section is 40% higher than the modulus at 10% elongation of the rubber mixtures of the strips forming the groups.

It was found that a section of rubber mixture between the groups that has a thickness essentially larger than the average diameter of the reinforcements of the circumferential strips, led to even better performance against aggression.

Furthermore, and to obtain greater sidewall rigidity and avoid the risk of loss of cohesion between the carcass reinforcement and the supplementary reinforcement, it is best to provide for the presence between the said carcass reinforcement and the said supplementary reinforcement of a de-coupling rubber mixture layer. This mixture is preferably chosen to have a modulus at 10% elongation that is lower than the modulus at 10% elongation of the mixture used for the carcass reinforcement.

Associated with this tire structure, a fabrication process is proposed for such a tire in accordance with which, after having made two strips formed of rubber mixture reinforced with reinforcing elements essentially parallel to one another and making an average angle between 30° and 90° with the longitudinal direction of the strip, those strips are positioned by winding on the part of the tire blank corresponding to one of the said tire's sidewalls. This process can be implemented during the building up of the tire on a drum, followed by shaping to give an essentially toric shape, or even during direct building up on a core such that no shaping phase is needed.

BRIEF DESCRIPTION OF THE DRAWINGS

Other characteristics and advantages of the invention emerge from the description given below with reference to the attached drawings, which show non-limiting examples of embodiments of the object of the invention.

FIG. 3 shows a plan view of a variant group of strips that constitute a second embodiment of a supplementary sidewall reinforcement according to the invention.

DESCRIPTION OF THE PREFERRED EMBODIMENTS

Figure 1:
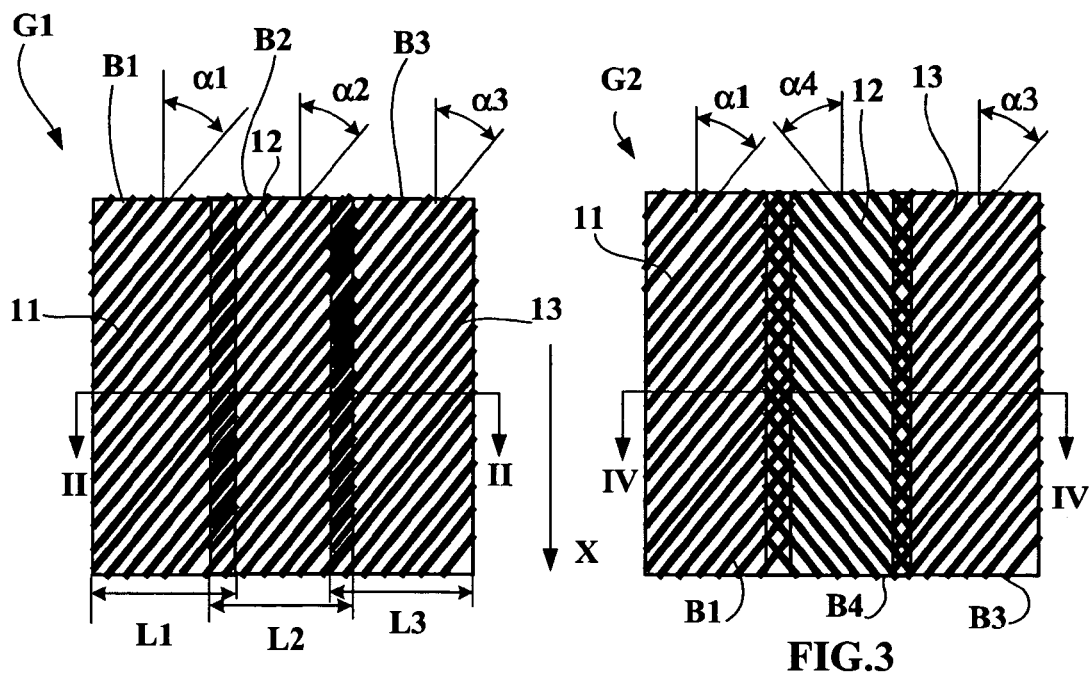
FIG. 1 shows a plan view of a group of strips that constitute a first embodiment of a supplementary sidewall reinforcement according to the invention.

FIG. 1 shows a first variant of a group G1 of three strips B1, B2, B3 having essentially equal widths L1, L2, L3 which form a supplementary reinforcement armature for the reinforcement of a tire sidewall. In the case presented, the widths L1, L2, L3 are larger than one-third of the total width Lt of the group G1. Here, the group G1 is shown on a cylindrical building former before incorporation in a tire.

Each strip B1, B2, B3 in the group comprises a plurality of metallic cables 11, 12, 13 arranged parallel to one another throughout the group G1, and making angles of inclination $\alpha 1$, $\alpha 2$, $\alpha 3$ essentially equal to 45° in the example presented (the said angle being measured relative to the circumferential direction indicated by the arrow X in the figure). In its radial extension (corresponding in FIG. 1 to a direction in the plane of the figure and perpendicular to the direction marked X), the strip B1 is partially coupled to the second strip B2, which is itself coupled to the third strip B3 by overlap over appropriate widths equal to at most 40% of the width of the said strips. 'Appropriate' means overlap widths that are sufficient to ensure that when the tire blank has been shaped, the strips B1, B2 and B3 still overlap.

Figure 2:
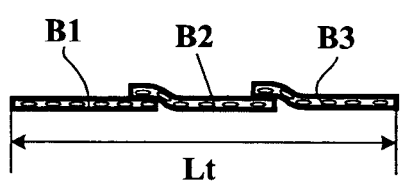
FIG. 2 shows a cross-sectional view along the line II—II in FIG. 1.

FIG. 2 is a cross-section along the line II—II in FIG. 1 showing the group before the shaping of the tire blank. The strip B3 partially covers the upper surface of the strip B2, while the latter in turn covers the upper surface of the strip B1.

Figure 4:
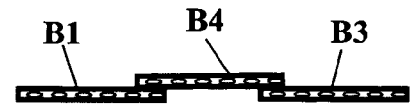
FIG. 4 shows a cross-sectional view along the line IV—IV in FIG. 3.

FIG. 3 shows a variant embodiment of a group G2 of three strips B1, B4, B3, the strips B1 and B3 being identical to those used in the group G1 illustrated in FIG. 1, while the intermediate strip B4 comprises the same reinforcements 12 as the strip B2 used in group G1, but in this case the said reinforcements 12 are inclined at an angle $\alpha 4$ of the same modulus as, but opposite sign to the angle $\alpha 1$, $\alpha 3$ of the reinforcements 11 and 13 of the strips B1 and B3. Moreover, and as can be seen in FIG. 4 which shows a section along a line IV—IV in FIG. 3, at its ends the intermediate strip B4 overlaps the two strips B1 and B3 in the direction of its width, with overlap widths that are essentially equal. Here, the widths of the three strips B1, B4, B3 are again identical but they could have been different.

In the examples shown in FIGS. 1 to 4, the angles of the reinforcements in all the strips are essentially equal, at least in their modulus; however, it is of course possible to make a group of several strips, for example three, in which the angles of inclination $\alpha 1$, $\alpha 2$, $\alpha 3$ of the reinforcements in each strip are different. In this case it is advantageous for the said angles to satisfy the following relationship:

$$\alpha 1 > \alpha 2 > \alpha 3$$

where angle $\alpha 1$ is the angle of the reinforcements in the strip located closest to the bead zone of the tire relative to the circumferential direction, angle $\alpha 3$ is the angle of the reinforcements in the strip located closest to the crown reinforcement, and angle $\alpha 2$ is that of the reinforcements in the intermediate strip.

The solution according to which the angle of the reinforcements in the strips forming each group increases progressively from the strips close to the bead zone towards those close to the crown of the tire, is equally possible although it does not offer the same advantages.

What has been said about the angle of the reinforcements in each strip can also apply to the average widths of each strip: the examples presented show strips of identical widths, but it is of course possible to provide different widths depending on the strips and/or depending on the groups, and also to have different overlap widths.

Figure 5:
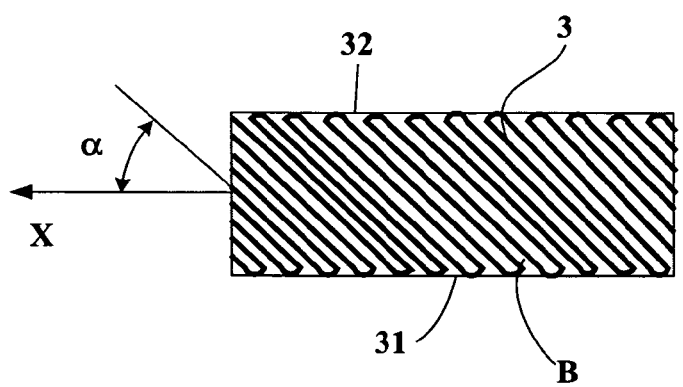
FIG. 5 shows a variant embodiment of a strip with a textile cable.

The variant of FIG. 5 represents the case of a strip B made by arranging a preferably textile cable 3 back and forth between the two edges 31 and 32 of the said strip and positioned at an average inclination $\alpha$ between 30° and 90°, the said inclination being measured relative to the longitudinal direction of the strip (marked by an arrow X in FIG. 5).

Figure 6:
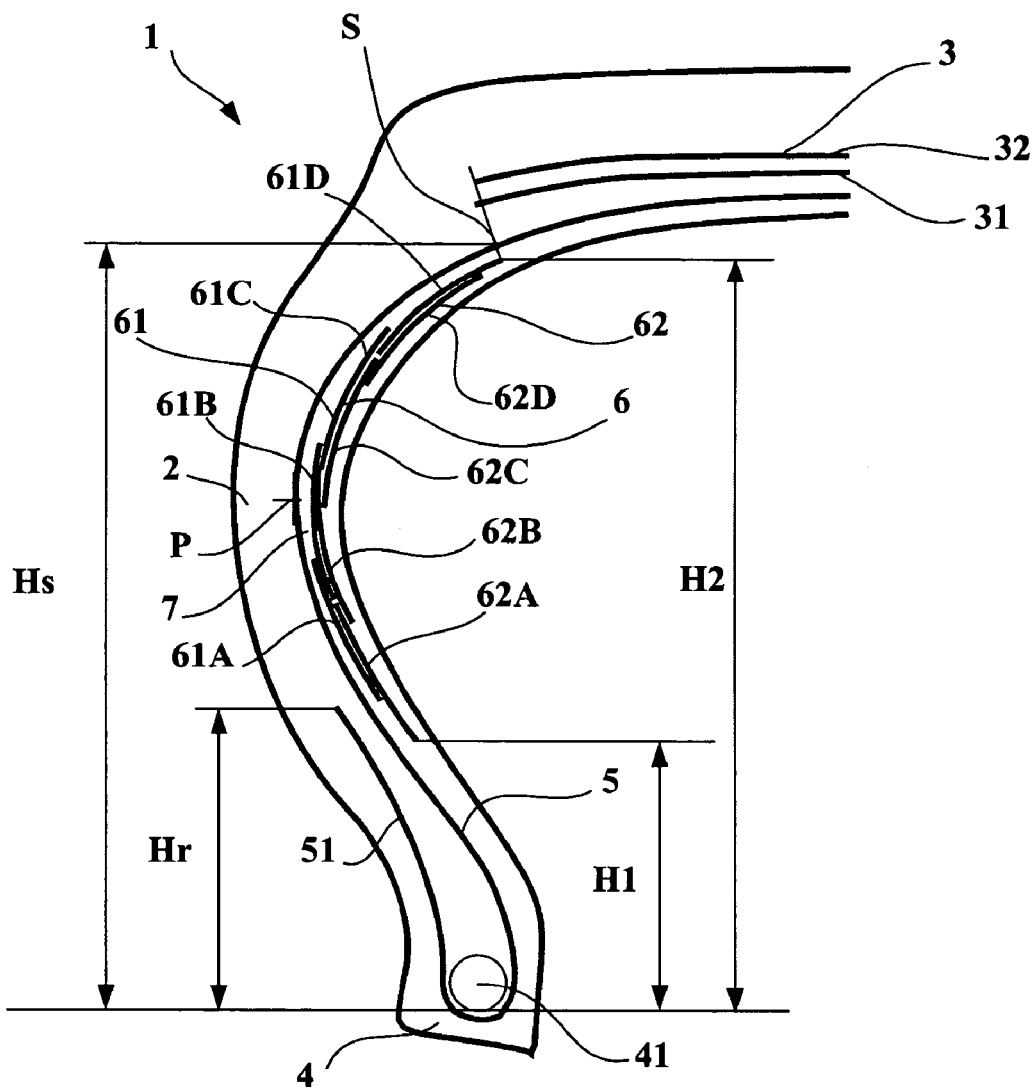
FIG. 6 shows a meridian section of a tire for a civil engineering vehicle, which comprises on the inside of the carcass reinforcement a supplementary reinforcement armature for the sidewalls, formed of two groups of strips according to the invention.

FIG. 6 shows a cross-section in a meridian plane, of part of a tire 1 of size 26.5 R 25 in which can be seen a sidewall 2 that extends between a crown 3 provided with a tread designed to be in contact with the ground during the rolling of the said tire, and a bead 4 designed to be in contact with a seat of a mounting rim.

This tire comprises a carcass reinforcement 5 that extends from one bead to the other, the said reinforcement 5 being anchored by turning up around circumferential reinforcement bead wires 41 present in each bead 4 to form turn-ups 51 of height Hr equal to 245 mm, the said height being measured radially relative to the base of the bead wire (inside diameter of the said bead wire). The carcass reinforcement 5 is formed of a ply made of a rubber mixture reinforced with metallic cables arranged radially, i.e. forming an angle close or equal to 90° relative to the circumferential direction.

Radially outside the carcass reinforcement 5, a crown reinforcement 3 comprises two plies 31 and 32 of rubber mixture reinforced by metallic reinforcing elements parallel to one another in each ply and crossed from one ply to the next (in each ply the said reinforcements make an average angle of 24° with the circumferential direction). The projections S on the carcass reinforcement of the axial ends of the crown are located radially at a distance Hs equal to 435 mm from the base of the bead wires (the said projections are made perpendicularly to the profile of the carcass reinforcement 5).

Furthermore, axially on the inside of the carcass reinforcement each sidewall 2 has a supplementary reinforcement 6 formed of two groups 61 and 62; each supplementary reinforcement 6 extends between a height H1 and a height H2 (these heights being measured relative to the base of the bead wire 41), on either side of the point P of the sidewall which is axially outermost over a total meridian length Lt.

It has been found advantageous for H1 to be less than Hr and for the ratio H2/Hs to be between 0.6 and 0.9. In the present case: H1=220 mm and H2=347 mm.

Figure 7:
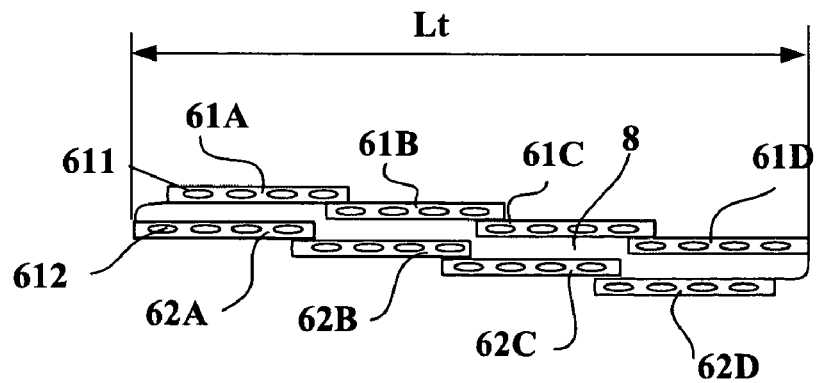
FIG. 7 shows a flat cross-section (i.e. before positioning on the tire) of the stacking of the two groups of strips that form the supplementary tire reinforcement shown in FIG. 6.

Each group 61, 62 is formed of several strips 61A, 61B, 61C, 61D and 62A, 62B, 62C, 62D which, viewed in meridian cross-section, all have a width of 40 mm and are superimposed over one another over an average width of 10 mm, as can be seen in FIG. 7. Each strip 61A, 61B, 61C, 61D of the group 61 is formed of a rubber mixture reinforced by "NYLON" reinforcing elements 611, which are parallel to one another within each strip.

Each strip 62A, 62B, 62C, 62D of the group 62 is formed of a rubber mixture reinforced by "NYLON" reinforcing elements 612 parallel to one another in each strip. In the tire blank condition the reinforcing elements in all the strips form an average angle equal to 80°; when the torus has been shaped, the average angle of the reinforcements in the strips located radially nearest the beads is 75° and that of the reinforcements in the strips radially nearest the crown is 65°.

The reinforcements of the strips in a given group have inclinations in the same direction relative to the circumferential direction. From one group to the other the inclinations of the reinforcements are of opposite signs. The rubber mixture 8 between the groups improves the de-coupling effect between the said groups; more precisely, the rubber mixture has a tensile modulus at 10% deformation higher than the tensile modulus at 10% of the rubber mixture coating the reinforcements of the strips, and preferably at least 30% (in the present case, the ratio of the moduli is equal to 1.4 and the average thickness is 2 mm, while the average diameter of the strip reinforcements is 1 mm).

In the example presented, the values of the angles of the reinforcement of the strips forming the groups are identical, but it is of course possible to use different angles.

Between the carcass reinforcement 5 and the supplementary sidewall reinforcement 6 there is a layer 7 of rubber mixture with an average thickness of 5 mm and a modulus at 10% elongation 40% lower than the modulus of the carcass reinforcement mixture.

To produce such a tire the procedure is as follows:

an internal rubber mixture is positioned on a building drum for a tire blank;

a strip is made up from a rubber mixture reinforced with reinforcing elements inclined by an appropriate angle relative to the longitudinal direction of the said strip;

the strip obtained in the preceding stage is positioned by winding onto the internal rubber mixture, making an appropriate number of turns to produce the total width of a group while partially overlapping each turn of the said strip over the previous turn;

the previous stage is repeated as many times as necessary to form the other group(s), taking into account the orientation of the angles of the reinforcements in each other group;

the carcass reinforcement and the other necessary constituents are positioned;

this first blank is shaped to obtain a toric shape before a crown reinforcement and tread are positioned;

the blank so created is molded and vulcanized.

Between the stages in which the various groups are produced, a thickness of a rubber mixture that has a de-coupling function between the said groups can also be positioned, again by winding.

This same process could be omitted in the case when a tire blank is made which does not require any shaping, notably when the blank is produced on a core having essentially the shape of the inside of the tire to be molded. In the latter case, after having positioned the internal mixtures on the core, each group is positioned directly over these internal mixtures either by winding a single strip in several turns or by winding a plurality of strips each of which has essentially the length of one turn (in the latter case it is advantageous to distribute the starting points of each strip regularly all around the circumference, so as to avoid a large concentration thereof that could give rise to irregularity during rolling).

The invention is not limited to the examples described and illustrated, and various modifications can be adopted without going beyond its scope.

What is claimed:

1. A radial tire comprising a crown reinforced by a crown reinforcement comprising at least two plies of rubber reinforced by cables or wires crossed from one ply to the next and surmounted radially by a tread designed to be in contact with the ground, two beads designed to be in contact with seats of a mounting rim, each bead being extended by a sidewall comprising a radial carcass reinforcement formed of at least one ply of rubber reinforced by a plurality of cables or wires, the said carcass reinforcement extending into the crown and being anchored in each bead to at least on element that is inextensible in the circumferential direction, the said tire comprising in at least one sidewall a supplementary reinforcement wherein, when viewed in meridian cross-section:

the supplementary reinforcement comprises at least two groups each formed of at least two strips that extend in the circumferential direction;

each strip, of width Li essentially equal to or greater than the total width Lt of the supplementary reinforcement divided by the total number of strips in the group concerned, is formed of rubber reinforced by a plurality of reinforcing elements comprised of cables or wires inclined at an angle α between 30° and 90°, the angle being measured on a new tire relative to the circumferential direction;

within any one group, each circumferential strip is superimposed partially over an adjacent strip, to avoid gaps between the strips, wherein the partial overlap of a strip with an adjacent strip in the same group is at most equal to 40% of the width Li of the strip.

2. The radial tire according to claim 1, wherein between each group is positioned a decoupling rubber mixture whose thickness is at least equal to the average diameter of the reinforcing elements in the strips.

3. The radial tire according to claim 2, wherein the tensile modulus at 10% elongation of the decoupling mixture is higher than that of a mixture coating the reinforcing elements.

4. The radial tire according to claim 3, wherein the tensile modulus at 10% elongation of the decoupling mixture is at least 30% higher than that of the mixture coating the reinforcing elements.

5. The radial tire according to claim 1, wherein in the tire, and from one strip to the next proceeding in the direction from the bead towards the crown, the angle of the reinforcing elements in the strips decreases progressively.

6. The radial tire according to claim 1, wherein in the tire, and from one strip to the next proceeding in the direction from the bead towards the crown, the angle of the reinforcing elements in the strips increases progressively.

7. The radial tire according to claim 1, wherein the cables or wires are inclined in the same direction relative to a radial plane, the groups of the supplementary reinforcement having their reinforcing elements crossed from one group to the next.

8. The radial tire according to claim 1, wherein within a given group the angle of inclination of the reinforcing elements in a strip is of opposite sign to the angle of inclination of the reinforcing elements in its neighboring strips.

9. The radial tire according to claim 1, wherein the reinforcing elements of the strips are of textile nature and are positioned in each strip by means of a back and forth positioning process between a lateral edge of the strip and the opposite lateral edge, at an average angle α between 30° and 90°.

10. The radial tire according to claim 9, wherein at least one of the groups is formed from a single continuous strip wound in several turns.

11. The radial tire according to claim 1 wherein at least one of the groups is formed from a single continuous strip wound in several turns.

12. The radial tire according to claim 1, wherein the supplementary reinforcement is arranged radially on the inside of the carcass reinforcement in the at least one sidewall, and a layer of rubber mixture separates the carcass reinforcement from the supplementary reinforcement, the rubber mixture having a modulus at 10% elongation that is lower than the modulus at 10% elongation of a rubber mixture of the carcass reinforcement.

13. The radial tire according to claim 11, wherein the supplementary reinforcement is arranged radially on the inside of the carcass reinforcement in at least one sidewall, and a layer of rubber mixture separates the carcass reinforcement from the supplementary reinforcement, the rubber mixture having a modulus at 10% elongation that is lower than the modulus at 10% elongation of the rubber mixture of the carcass reinforcement.

14. The radial tire according to claim 1, wherein the supplementary reinforcement is located on opposite radial sides of a point P of the tire, which point constitutes an axially outermost point of the respective sidewall.

15. A radial tire comprising a crown reinforced by a crown reinforcement comprising at least two plies of rubber reinforced by cables or wires crossed from one ply to the next and surmounted radially by a tread designed to be in contact with the ground, two beads designed to be in contact with seats of a mounting rim, each bead being extended by a sidewall comprising a radial carcass reinforcement formed of at least one ply of rubber reinforced by a plurality of cables or wires, the said carcass reinforcement extending into the crown and being anchored in each bead to at least on element that is inextensible in the circumferential direction, the said tire comprising in at least one sidewall a supplementary reinforcement, wherein, when viewed in meridian cross-section:

the supplementary reinforcement comprises at least two groups each formed of at least two strips that extend in the circumferential direction;

the supplementary reinforcement comprises at least one continous strip wound in a plurality of turns, wherein successive turns are in partial superimposed relationship to avoid gaps between the turns;

the at least one strip formed of rubber reinforced by a plurality of cables or wires inclined at an angle α between 30° and 90°, the angle being measured on a new tire relative to the circumferential direction.

16. The radial tire according to claim 15, wherein the partial overlap of a turn with an adjacent turn is at most equal to 40% of the width Li of the turn.

17. The radial tire according to claim 15, wherein the supplementary reinforcement is arranged radially on the inside of the carcass reinforcement in the at least one sidewall, and a layer of rubber mixture separates the carcass reinforcement from the supplementary reinforcement, the rubber mixture having a modulus at 10% elongation that is lower than the modulus at 10% elongation of a rubber mixture of the carcass reinforcement.

18. The radial tire according to claim 15, wherein the supplementary reinforcement is located on opposite radial sides of a point P of the tire, which point constitutes an axially outermost point of the respective sidewall.

19. A radial tire comprising a crown reinforced by a crown reinforcement comprising at least two plies of rubber reinforced by cables or wires crossed from one ply to the next and surmounted radially by a tread designed to be in contact with the ground, two beads designed to be in contact with seats of a mounting rim, each bead being extended by a sidewall comprising a radial carcass reinforcement formed of at least one ply of rubber reinforced by a plurality of cables or wires, the said carcass reinforcement extending into the crown and being anchored in each bead to at least on element that is inextensible in the circumferential direction, the said tire comprising in at least one sidewall a supplementary reinforcement, wherein, when viewed in meridian cross-section:

the supplementary reinforcement comprises at least two groups each formed of at least two strips that extend in the circumferential direction;

each strip, of width Li essentially equal to or greater than the total width Lt of the supplementary reinforcement divided by the total number of strips in the group concerned, is formed of rubber reinforced by a plurality of cables or wires inclined at an angle α between 30° and 90°, the angle being measured on a new tire relative to the circumferential direction;

within any one group, each circumferential strip is superimposed partially over an adjacent strip, to avoid gaps between the strips;

the supplementary reinforcement is arranged radially on the inside of the carcass reinforcement in the at least one sidewall, and a layer of rubber mixture separates the carcass reinforcement from the supplementary reinforcement, the rubber mixture having a modulus at 10% elongation that is lower than the modulus at 10% elongation of a rubber mixture of the carcass reinforcement.

20. The radial tire according to claim 19, wherein the supplementary reinforcement is located on opposite radial sides of a point P of the tire, which point constitutes an axially outermost point of the respective sidewall.

* * * * *